April 24, 1956 W. G. RUDY 2,743,150

GLASS TARGETS FOR IMAGE ORTHICONS

Filed June 1, 1951

INVENTOR
William G. Rudy
BY
William A. Zalesak
ATTORNEY

United States Patent Office 2,743,150

Patented Apr. 24, 1956

2,743,150

GLASS TARGETS FOR IMAGE ORTHICONS

William G. Rudy, Lancaster, Pa., assignor to Radio Corporation of America, a corporation of Delaware Application June 1, 1951, Serial No. 229,465

4 Claims. (Cl. 313—68)

This invention is directed to an electron discharge device and more particularly to a camera or pickup tube in which an optical image is converted to an electric signal.

The invention is directed to an improvement in an image orthicon type camera tube. Such a tube is one having an image section including a photocathode electrode upon which a scene to be televised is projected. Photoelectrons from the photocathode are focused upon an insulator target electrode to establish a charge pattern on the target corresponding to the optical image focused on the photocathode. An opposite surface of the target is scanned by a low velocity electron beam to discharge the charge pattern on the target surface as well as to provide modulation of the reflected portion of the scanning beam to provide a video television signal. The image orthicon camera tube is well known and is fully described in U. S. patent to H. B. Law, 2,460,093.

In the operation of the image orthicon type pickup tube there has been difficulty in providing uniform pictures. The quality of the picture produced has varied unpredictably from tube to tube. The defects found in the picture are those in which certain smudgy or foggy areas appear, or in which there is non-uniformity of sensitivity over the target surface. Other defects are those in which there has been observed a scatttering of bright spots in the picture. It has been found that these defects in the picture are produced by the pickup tube and are caused by imperfections in the glass target electrode used in the tube. These imperfections are due to non-uniformities in the glass target film produced by occlusions, such as air bubbles and stones within the glass film. Furthermore, another source of picture non-uniformity has been due to dust particles or other foreign matter adhering to the surface of the glass target film. These target defects result in non-uniformities of the charge pattern on the target, which in turn, appears as non-uniformities in the observed picture.

It is thus an object of the invention to provide a television pickup tube which will produce a uniformity of picture.

It is another object of my invention to provide a television pickup tube, of the image orthicon type, having an improved target electrode which will eliminate picture non-uniformity.

It is a further object of my invention to provide a target electrode for the television pickup tube of the orthicon type which will provide improved picture uniformity.

It is another object of my invention to provide a television pickup tube target electrode having a uniform target surface.

The specific nature of the invention is that of providing a target electrode for a television pickup tube formed of a thin film of glass whose surface is treated in several ways to form a bloom or mat on the surface thereof, whereby the effects of non-uniformity inherent in the glass or deposits of foreign matter on the glass are eliminated. Specifically, one operable method of treating the glass target is to expose the surface of the target to a mild sulfur dioxide atmosphere to provide a bloom, or chemical deposit, or formation on the glass surface.

Figures 1, 2, 3, 4:
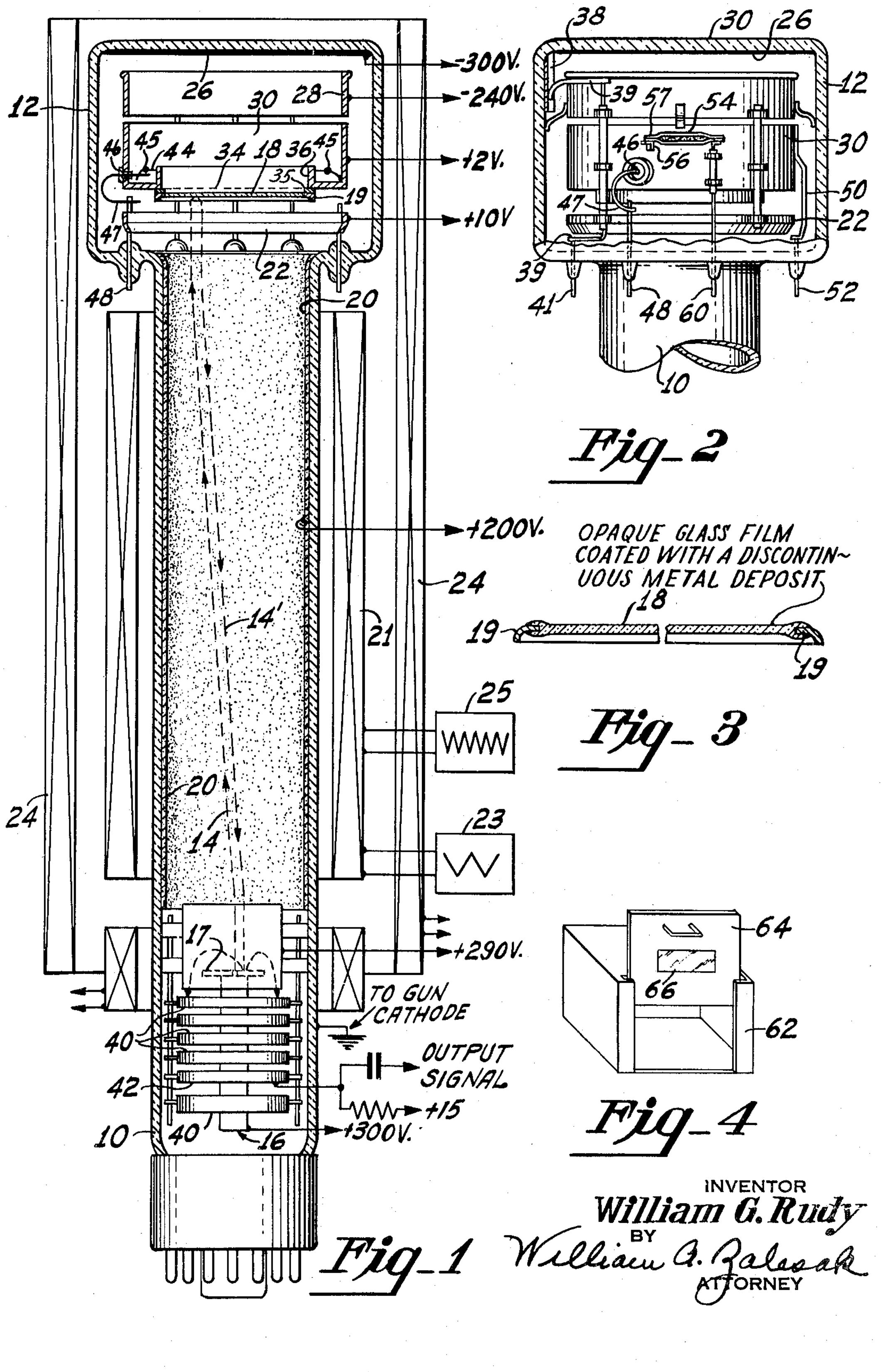
Figure 1 is a longitudinal cross section of an image orthicon camera tube incorporating the invention.
Figure 2 is a view partially in section of one end of the tube of Figure 1.
Figure 3 is a sectional view of a target electrode used in the tube of Figure 1.
Figure 4 is a piece of apparatus used for processing the target of Figure 3, in accordance with the invention.

Figure 1 shows an image orthicon camera tube comprising an envelope 10 having an enlarged portion 12 at one end for enclosing an image section to be described. Within the opposite end of the tubular envelope is an electron gun structure 16 comprising a conventional heater, cathode and control grid structures (not shown), for producing an electron beam 14. An additional accelerating electrode 20 is formed as a wall coating on the inner surface of the tube envelope, for accelerating the electron beam 14 toward a target electrode 18. Pairs of horizontal and vertical deflecting coils are formed into a yoke structure 21 surrounding the tube envelope. The deflecting coils provide fields perpendicular to each other and to the tube axis. The deflecting coils are connected, as is well known, to saw-tooth current sources 23 and 25 for providing respectively frame and line scansion of the electron beam 14 over the surface of the target 18. Such a deflecting system is well known in the art and is not described in greater detail as it does not constitute a part of the invention.

A decelerating electrode 22, formed as a ring, is mounted within the envelope immediately in front of target electrode 18 and on the scanned side thereof. A low potential established on the decelerating electrode brings the velocity of the electron beam to substantially zero in front of the target surface. Surrounding the tube envelope is a single coil 24 for providing a magnetic field having lines of force parallel to the tube axis and extending from the end of gun structure 16 beyond the end of the envelope portion 12. The field of coil 24 provides a focusing action on the electrons of beam 14 to bring them to a small, well defined point of focus on the surface of target 18.

At the opposite end of the tube envelope, there is formed a photocathode electrode 26. Such a photocathode surface may be one such as formed from a sensitized alloy of silver and bismuth as set forth in co-pending application Serial No. 79,328 of R. E. Johnson, filed March 3, 1949, now Patent No. 2,682,479.

First and second accelerating electrodes, 28 and 30 respectively, are mounted coaxially to the tube envelope and are spaced between the photoelectric cathode 26 and target 18. These electrodes provide an accelerating and a converging electrostatic field in front of the photocathode 26 to urge the photoelectrons therefrom toward the target electrode 18 at a high velocity. This electrostatic field also, condenses the photoemission in order that it may land on the smaller area of target 18. The voltage of accelerating electrode 28 is variable so that the accelerating field between electrodes 28 and 30 can be adjusted to eliminate distortion of the picture. Target electrode 18 is formed of an insulator such as a thin film of glass having a slight conductivity and made in the manner set forth in U. S. Patent 2,473,220 to Albert Rose. Photoelectrons from photocathode 26 will strike the adjacent surface of the glass film 18 with sufficient energy to provide a secondary emission therefrom greater than unity.

A fine mesh screen 34 is mounted on a ring 35 and is closely spaced from the photocathode side of the glass film 18. Screen 34 serves as a collector electrode and prevents the glass target surface from charging to a potential higher than that of the screen 34. Glass film 18 is mounted on a ring 19 (Fig. 3) fixed to ring 35 which in turn is mounted on a short tubular mounting member 36. As indicated in Figures 1 and 2, mounting member 36 is a restricted, flanged portion of the second accelerating electrode 30. The potential of electrode 30 and thus of mesh 34 is maintained at several volts positive relative to the potential of the cathode of electron gun 16. Flanged member 36 shields target sheet 18 and mesh 34 from metal evaporated during formation of the photocathode surface 26. Silver-bismuth alloy metal beads 45 are mounted on a heater filament 44 in the channel between the wall of electrode 30 and the flanged mounting member 36. During tube processing, photocathode 26 is formed by evaporating the silver bismuth alloy onto the end of the tube envelope 12. During this step, flanged member 36 prevents the evaporated metal alloy from falling on the surface of target sheet 18.

The operation of the tube of Figure 1 is briefly as follows. With no illumination on photocathode 26, electron beam 14 is scanned across the target surface. Low energy electrons from the beam land on the target surface and drive the surface to substantially zero or gun cathode potential. At this point, the remaining electrons of the beam are reflected toward the gun 16. When a light pattern is focused on the photocathode 26, photoelectrons are emitted from each illuminated portion of the photocathode in an amount proportional to the light intensity thereon. The photoelectrons strike the surface of insulator glass target sheet 18 and initiate a secondary emission having an emission ratio greater than unity from the bombarded areas to drive them in a positive direction toward the potential of collector screen 34. In this manner, there is set up on the photocathode side of the glass film 18 a charge pattern corresponding to the pattern of light and shade focused upon the photocathode 26. Due to the extreme thinness of the glass target sheet 18, there is established a potential pattern on the scanned side of film 18 corresponding to the charge pattern on the photoelectric side of the target. Accordingly, the potential of the scanned surface of target 18 will vary from point to point, from substantially zero volts to the several volts positive potential of collector screen 34.

The electron beam 14 will approach target electrode 18 at very low velocity immediately in front of the target surface. When the beam approaches target areas which are at zero potential, it is reflected back toward the electron gun 16. However, a more positive area of the target surface will cause electrons from the approaching beam to land in numbers sufficient to neutralize the positive potential charge at the area, and thus, drive the charged area of the target to cathode potential. The remaining electrons of the beam are then reflected back to the gun end of the tube. In this manner, then, as the electron beam is scanned over the target surface, there is reflected toward the gun end of the tube a modulated return beam 14'. The return beam follows substantially the same path as the incident beam 14 and strikes the end 17 of the gun structure which is formed as a dynode electrode and as the first stage of a multiplier section 40. The multiplier 40 is of a type disclosed in U. S. Patent 2,433,941 to P. K. Weimer. The modulated electron beam 14' is converted, as is well known, into output video signal voltages from the collector electrode 42 of the multiplier section 40.

It has been found that the resulting picture produced by tubes of the type described have a non-uniformity. There can be observed irregular grayish areas in the picture, as well as small bright spots which are in no way part of the scene televised. These imperfections detract from the quality of the televised picture.

The details of the formation of the photosensitive film 26 are specifically described in the cited copending application, of Ralph E. Johnson. To form such a photocathode, first tube envelope 10 is exhausted and then a thin film of silver-bismuth alloy is put down on the end of the tube by evaporating the silver alloy pellets 45 from filament 44. As shown in Figures 1 and 2, filament 44 is connected by a conductor 47 to lead in 48. The other end of filament 44 is attached to the accelerating electrode 30, which, as shown in Figure 2, is tied by conductor 50 to lead 52. During tube processing, a potential difference between leads 48 and 52 causes a current flow through filament 44 which is then heated to a sufficiently high temperature to evaporate the silver-bismuth pellets.

The silver bismuth film is next sensitized by oxidizing the film and then putting thereon a thin deposit of cesium metal. The cesium deposit is formed by heating a capsule 54 of cesium to vaporize the metal. Capsule 54, as shown in Figure 2 is connected at one end to electrode 30 and at the other end to a lead 60. A potential difference applied between leads 60 and 52 will raise the temperature of capsule 54 to a point where the cesium therein will be vaporized. The cesium vapor, in the exhausted tube, will permeate through the enlarged section 12 of the tube and condense as a sensitizing deposit on the oxidized silver bismuth film.

The target film 18, as disclosed in the above cited patent to Albert Rose, is formed of a thin film of glass. Such a film is made by blowing a large bubble of glass until the walls of the bubble have the desired thickness. A suitable area of the bubble wall is cut out and laid across a supporting ring such as the type of ring 19, shown in Figure 3. The ring and the bubble portion are placed in an oven and heated for 3 or 4 minutes at a temperature of 850° C. At this temperature, the glass bubble will soften to a point, where it will seal at its periphery to ring 19. Also, the surface tension of the soft glass will be such as to draw the glass tautly to form a tight diaphragm over the open center of support ring 19, as shown in Figure 3.

It has been found that the picture defects described above are due to imperfections formed in the glass film as well as foreign deposits on the surface of the glass target film 18. These deposits are dust and other material which falls on the glass surface during tube manufacture. During the formation of the photocathode surface 26 of the tube, the cesium vapor from pellet 54 condenses to varying degrees on all the cool surfaces within the tube envelope. The cesium vapor condenses in greater concentrations around the imperfections in the glass target, as well as any foreign material on the glass surface. This results in a greater emission of secondary electrons from those areas of greater cesium concentration. This abnormal emission of secondary electrons from the glass target appears as white spots or gray areas on the televised picture.

In accordance with the invention, a formation or deposition is provided on the glass target surface in order that the cesium vapor will condense uniformly on the surface of the glass. Specifically, the glass target 18 is exposed to vapors of acids or other vapors, which react with the glass surface to provide uniform partially opaque or hazy formation. The reaction between the glass and acid vapor forms granules, or crystals. The cesium vapor permeating through the envelope, during the formation of the photocathode, will condense on the surface of film 18 uniformly. Thus, during tube operation, the secondary emission from the glass target will also be uniform.

The glass target 18 may be treated by several different vaporous materials, such as sulfur dioxide vapor, water vapor or the vapor of any volatile acid, as hydrochloric acid, sulfuric acid, phosphoric acid, as well as any one of the halide vapors. The sulfur dioxide, for example, will react chemically with the sodium oxide which is part of the composition of the glass. Crystalline sodium sulphate is formed on the glass surface. This formation is seen as a uniform partial opaqueness or haziness over the surface of the glass film 18. The formation tends to cover up imperfections in the glass target, as well as foreign deposits on the glass surface. The cesium vapors now will not condense more on one portion of the target surface than on others.

A particular method of providing the partially opaque coating on the target is one which has been used successfully in making tubes of the type described. As set forth above, the glass film 18 is formed from a portion of a glass bubble, which is fired to a temperature to form a taut glass diaphragm. In forming the target in this manner, the glass bubble portion and support ring 19 are placed into a metallic box 62 shown in Figure 4. Box 62 has a sliding door 64, equipped with a Pyrex glass window 66. Normally the box with the target ring 19 is placed in an electric furnace and fired to the required temperature.

In accordance with the invention, a sulfur dioxide atmosphere is provided within the box during firing of the target. The amount of sulfur dioxide required is very slight, so that the normal procedure of passing a stream of sulfur dioxide through the furnace is not used, as this method cannot be controlled to the degree required. Instead, however, the following procedure is used. Around two hundredths of a gram of sulfur, in a ceramic crucible is placed in an empty target box, similar to that shown in Figure 4. The empty box is fired in the furnace for substantially 30 minutes at around 800° C. to convert the sulfur into sulfur dioxide. As the box is allowed to cool, the sulfur dioxide is absorbed by the box. The target support ring 19, with the bubble portion is now placed in the box and the target film 18 formed in the regular manner described above. During this second firing, the sulfur dioxide absorbed by the walls of the box reacts with the glass surface of film 18 to form a bloom or a white uniform hazy surface layer of sodium sulphate. The box with the absorbed sulfur dioxide may be used for firing about 12 targets before the box has to be recharged with sulfur dioxide, in the manner described above.

The formation of a sulphate coating on the surface of the glass has other advantages, which were not obvious at first. The presence of the sulphate coating prevents adherence of dust particles to a much greater degree than the uncoated glass target. Thus, foreign deposits or dust particles which settle on the target are much easier to remove. Also, it is possible to observe both imperfections in the glass and foreign deposits on the target surface much more easily. This enables a better inspection of the targets and the elimination of imperfect targets.

Another unobvious advantage in the use of this type target is the reduction of "after image" persistence. In testing a finished pickup tube, the tube is placed in a camera and directed at a stationary pattern for about 30 seconds. The camera is then pointed at a blank wall and the persistence of the image of the pattern is measured. Previously, it has been found that the persistence of the image of the pattern lasted, in some cases, to 90 seconds. It is not clear why such a persistence of the image should exist. However, it is noted that with an opaque target, treated with a sulfur dioxide firing, as described above, the maximum average image persistence has been reduced from around 45 seconds to 20 seconds. Furthermore, many of the camera tubes using an opaque or hazy target have no image persistence at all. Since it is not clearly understood why there should be an image persistence, it is also not known in what way the sulfur dioxide firing of the target eliminates this image persistence effect.

The method described provides a controllable process for using sulfur dioxide. If the target is exposed during firing to larger quantities of $SO_2$ the glass becomes brittle and tends to break. Also the seal between film 18 and ring 19 is attacked and film 18 loosens up so that the target cannot be used. Furthermore, excessive reaction of glass 18 with $SO_2$ reduces the resistivity of the glass to a degree that makes the target unusable.

It has been mentioned that other vapors which attack the glass and leave a mat or opaque surface can be used. For example, halide acid vapors may be used, such as for example, hydrogen fluoride. This vapor attacks the glass surface and will leave deposits of calcium, potassium and lead silicofluorides. This formation remains on the surface of the glass to provide a uniform mat effect. The hydrogen fluoride is introduced as a weak solution in a crucible placed in box 62 during the firing of the glass target. The concentration of the HF solution must be only that which will provide a hazy chemical reaction with the glass during the firing time used. Larger concentrations of HF vapor within the box will weaken the glass seal between glass 18 and ring 19. Other halogen acid vapors or halogen vapors may be used in a similar manner. Water vapor also will react with the glass surface of target 18 to form a hazy mat surface. The reaction may be brought about by introducing a neutral gas mixed with water vapor into the box 62 during the firing of the glass target.

It is possible to form a mat surface on the target 18 by the evaporation thereon of any appropriate material. Such a material may be conductive. But, the material must be discontinuous, so as not to provide lateral conductivity. Targets have been made with deposits thereon of evaporated silver, for example.

From the foregoing it will be apparent that the present invention provides an improved target electrode and an improved television pickup tube which has the improved disclosed characteristics.

I claim:

1. A target electrode for an electron discharge device, said target electrode comprising an annular support member, a thin glass sheet sealed across the center of said support member, and a uniform mat formation on the surface of said glass sheet, said formation consisting of a reaction product of the glass of said sheet with a corrosive material.

2. A television pickup tube comprising an electron gun for providing a beam of electrons, a target electrode spaced from said gun, said target electrode including a support member, a thin glass sheet fixed to said support member, a uniform mat formation on the surface of said glass sheet, said formation consisting of a reaction product of the glass of said sheet with a corrosive material, and a collector electrode for collecting beam electrons from said target electrode.

3. A television camera tube comprising a target electrode and an electron gun spaced from said target electrode, said gun including a source of electrons and electrode means for forming an electron beam and directing said beam toward said target electrode, said target electrode including an annular support member, a thin glass sheet sealed across the center of said support member, and a partially opaque mat formation over all portions of the surface of said glass sheet, said formation consisting of a reaction product of the glass of said sheet with a corrosive material, and a discontinuous film of metal on said formation.

4. A television camera tube comprising a target electrode and an electron gun spaced from said target electrode, said gun including a source of electrons and electrode means for forming an electron beam and directing said beam toward said target electrode, said target electrode including an annular support member, a thin glass sheet sealed across the center of said support member, the surface of said glass sheet having thereon a partially opaque formation, and a discontinuous film of cesium on said opaque surface of said glass sheet.

References Cited in the file of this patent

UNITED STATES PATENTS

| | | |
|---|---|---|
| 1,782,169 | Kamita | Nov. 18, 1930 |
| 2,250,283 | Teal | July 22, 1941 |
| 2,264,488 | Teves et al. | Dec. 2, 1941 |
| 2,337,460 | French | Dec. 21, 1943 |
| 2,337,569 | Pietschack | Dec. 28, 1943 |
| 2,403,239 | Rose | July 2, 1946 |
| 2,433,941 | Weimer | Jan. 6, 1948 |
| 2,473,220 | Rose | June 14, 1949 |
| 2,506,741 | Rose | May 9, 1950 |
| 2,507,958 | Cassman | May 16, 1950 |